US009640163B2

(12) United States Patent
Fejzo et al.

(10) Patent No.: US 9,640,163 B2
(45) Date of Patent: May 2, 2017

(54) AUTOMATIC MULTI-CHANNEL MUSIC MIX FROM MULTIPLE AUDIO STEMS

(71) Applicant: DTS, Inc., Calabasas, CA (US)

(72) Inventors: Zoran Fejzo, Los Angeles, CA (US); Fred Maher, Los Angeles, CA (US)

(73) Assignee: DTS, Inc., Calabasas, CA (US)

( * ) Notice: Subject to any disclaimer, the term of this patent is extended or adjusted under 35 U.S.C. 154(b) by 49 days.

(21) Appl. No.: 14/206,868

(22) Filed: Mar. 12, 2014

(65) Prior Publication Data

US 2014/0270263 A1 Sep. 18, 2014

Related U.S. Application Data

(60) Provisional application No. 61/790,498, filed on Mar. 15, 2013.

(51) Int. Cl.

| | |
|---|---|
| ***H04B 1/00*** | (2006.01) |
| ***G10H 1/46*** | (2006.01) |
| ***G10H 1/12*** | (2006.01) |
| ***H04S 3/00*** | (2006.01) |

(52) U.S. Cl.

CPC ............... *G10H 1/46* (2013.01); *G10H 1/125* (2013.01); *H04S 3/00* (2013.01); *G10H 2210/125* (2013.01); *G10H 2210/295* (2013.01); *G10H 2210/301* (2013.01); *G10H 2250/055* (2013.01); *H04S 3/008* (2013.01); *H04S 2400/07* (2013.01); *H04S 2400/15* (2013.01); *H04S 2420/03* (2013.01)

(58) Field of Classification Search

CPC ............. H04H 60/04; G10H 2210/295; G10H 2210/301; G10H 2250/055; H04S 3/00; H04S 3/02; H04S 3/008

USPC ............................ 381/118–119, 109; 700/94

See application file for complete search history.

(56) References Cited

U.S. PATENT DOCUMENTS

| | | | | |
|---|---|---|---|---|
| 6,826,282 | B1 | 11/2004 | Pachet et al. | |
| 6,931,134 | B1 * | 8/2005 | Waller, Jr. ............ | G10H 1/0091 381/119 |
| 7,078,607 | B2 | 7/2006 | Alfernedd | |
| 7,333,863 | B1 | 2/2008 | Lydecker et al. | |
| 7,343,210 | B2 | 3/2008 | DeVito et al. | |
| 7,526,348 | B1 | 4/2009 | Marshall et al. | |
| 7,590,249 | B2 | 9/2009 | Jang et al. | |
| 7,636,448 | B2 | 12/2009 | Metcalf | |

(Continued)

FOREIGN PATENT DOCUMENTS

WO 2013006338 A2 1/2013

OTHER PUBLICATIONS

Pachet et al., "Constraint-Based Spatialization", journal, In First COST-G6 Workshop on Digital Audio Effects (DAXF98), Barcelona (Spain), Nov. 19-21, 1998, 4 total pages.

(Continued)

*Primary Examiner* — Disler Paul

(74) *Attorney, Agent, or Firm* — SoCal IP Law Group LLP; John E. Gunther

(57) ABSTRACT

There are disclosed automatic mixers and methods for creating a surround audio mix. A set of rules may be stored in a rule base. A rule engine may select a subset of the set of rules based, at least in part, on metadata associated with a plurality of stems. A mixing matrix may mix the plurality of stems in accordance with the selected subset of rules to provide three or more output channels.

26 Claims, 9 Drawing Sheets

(56) References Cited

U.S. PATENT DOCUMENTS

| | | | | |
|---|---|---|---|---|
| 8,331,572 | B2 * | 12/2012 | Breebaart | G10L 19/008 381/100 |
| 8,331,585 | B2 * | 12/2012 | Hagen | H04R 3/005 369/4 |
| 9,136,881 | B2 * | 9/2015 | Groeschel | H03G 3/3005 |
| 2001/0055398 | A1 | 12/2001 | Pachet et al. | |
| 2005/0152562 | A1 * | 7/2005 | Holmi | H04S 7/307 381/86 |
| 2007/0044643 | A1 | 3/2007 | Huffman | |
| 2007/0297624 | A1 | 12/2007 | Gilman | |
| 2008/0015867 | A1 | 1/2008 | Kraemer | |
| 2008/0080720 | A1 * | 4/2008 | Jacob | H04H 60/04 381/103 |
| 2010/0098275 | A1 | 4/2010 | Metcalf | |
| 2011/0013790 | A1 | 1/2011 | Hilpert et al. | |
| 2011/0022402 | A1 | 1/2011 | Engdegard et al. | |
| 2011/0137662 | A1 | 6/2011 | McGrath et al. | |
| 2013/0170672 | A1 * | 7/2013 | Groeschel | H03G 3/3005 381/119 |
| 2014/0133683 | A1 * | 5/2014 | Robinson | H04S 3/008 381/303 |
| 2014/0369528 | A1 * | 12/2014 | Ellner | H04B 1/00 381/119 |

OTHER PUBLICATIONS

Pachet, Francois, "Music Listening: What is in the Air?", Sony CSL Internal Report, published in 1999, 16 total pages.

World Intellectual Property Organization, International Search Report and Written Opinion for International Application No. PCT/US2014/024962, mail date of Aug. 5, 2014, 6 total pages.

* cited by examiner

800

AUTOMATIC MULTI-CHANNEL MUSIC MIX FROM MULTIPLE AUDIO STEMS

RELATED APPLICATION INFORMATION

This patent claims priority from Provisional Patent Application No. 61/790,498, filed Mar. 15, 2013, titled AUTOMATIC MULTI-CHANNEL MUSIC MIX FROM MULTIPLE AUDIO STEMS.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to audio signal processing and, in particular, to methods for automatic mixing of multi-channel audio signals.

Description of the Related Art

The process of making an audio recording commonly starts by capturing and storing one or more different audio objects to be combined into the ultimate recording. In this context, "capturing" means converting sounds audible to a listener into storable information. An "audio object" is a body of audio information that may be conveyed as one or more analog signals or digital data streams and may be stored as an analog recording or a digital data file or other data object. Raw, or unprocessed, audio objects may be commonly referred to as "tracks" in remembrance of a time when each audio object was, in fact, recorded on a physically separate track on a magnetic recording tape. Currently, "tracks" may be recorded on an analog recording tape or may be recorded digitally on digital audio tape or on a computer readable storage medium.

Digital Audio Workstations (DAWs) are commonly used by audio music professionals to integrate individual tracks into a desired final audio product that is eventually delivered to the end user. These final audio products are commonly referred to as "artistic mixes". The creation of an artistic mix requires a considerable amount of effort and expertise. In addition artistic mixes are normally subject to approval by the artists that own the rights to the particular content.

The term "stem" is widely used to describe audio objects. The term is also widely misunderstood since "stem" is commonly given different meanings in different contexts. During cinematic production, the term "stem" usually refers to a surround audio presentation. For example, the final audio used for movie audio playback is commonly referred to as a "print master stem". For a 5.1 presentation, the print master stem consists of 6 channels of audio—left front, right front, center, LFE (low frequency effects, commonly known as subwoofer), left rear surround, and right rear surround. Each channel in the stem typically contains a mix of several components such as music, dialog, and effects. Each of these original components, in turn, may be created from hundreds of sources or "tracks". To complicate things even further, when films are mixed, each component of the audio presentation is "printed" or recorded separately. At the same time that the print master is being created, each major component (e.g. dialog, music, effects) may also be recorded or "printed" to a stem. These are referred to as "D M & E" or dialog, music and effects stems. Each of these components may be a 5.1 presentation containing six audio channels. When the D M & E stems are played together in synchronism, they sound exactly the same as the print master stem. The D M & E stems are created for a variety of reasons, with foreign dialog replacement being a common example.

During recorded music production, the reason for the creation of stems and the nature of the stems are substantially different from the cinematic "stems" described above. A primary motivation for stem creation is to allow recorded music to be "re-mixed". For example, a popular song that was not meant for playing in dance clubs may be re-mixed to be more compatible with dance club music. Artists and their record labels may also release stems to the public for public relations reasons. The public (typically fairly sophisticated users with access to digital audio workstations) prepare remixes which may be released for promotional purposes. Songs may also be remixed for use in video games, such as the very successful Guitar Hero and Rock Band games. Such games rely on the existence of stems representing individual instruments. The stems created during recorded music production typically contain music from different sources. For example, a set of stems for a rock song may include drums, guitar(s), bass, vocal(s), keyboards, and percussion.

In this patent, a "stem" is a component or sub-mix of an artistic mix generated by processing one or more tracks. The processing may commonly, but not necessarily, include mixing multiple tracks. The processing may include one or more of level modification by amplification or attenuation; spectrum modification such as low pass filtering, high pass filtering, or graphic equalization; dynamic range modification such as limiting or compression; time-domain modification such as phase shifting or delay; noise, hum, and feedback suppression; reverberation; and other processes. Stems are typically generated during the creation of an artistic mix. A stereo artistic mix is typically composed of four to eight stems. As few as two stems and more than eight stems may be used for some mixes. Each stem may include a single component or a left component and a right component.

Since the most common techniques for delivering audio content to listeners have been compact discs and radio broadcasts, the majority of artistic mixes are stereo, which is to say the majority of artistic mixes have only two channels. In this patent, a "channel" is a fully-processed audio object ready to be played to a listener through an audio reproduction system. However, due to the popularity of home theater systems, many homes and other venues have surround sound multi-channel audio systems. The term "surround" refers either to source material intended to be played on more than two speakers distributed in a two or three dimensional space, or to playback arrangements which include more than two speakers distributed in two or three dimensional space. Common surround sound formats include 5.1, which includes five separate audio channels plus a low frequency effects (LFE) or sub-woofer channel; 5.0, which includes five audio channels without an LFE channel; and 7.1, which includes seven audio channels plus an LFE channel. Surround mixes of audio content have a great potential to achieve more engaging listener experience. Surround mixes may also provide a higher quality of reproduction since the audio is reproduced by an increased number of speakers and thus may require less dynamic range compression and equalization of individual channels. However, creation of another artistic mix that is designated for multi-channel reproduction requires an additional mixing session with the participation of artists and mixing engineers. The cost of a surround artistic mix may not be approved by content owners or record companies.

In this patent, any audio content to be recorded and reproduced will be referred to as a "song". A song may be, for example, a 3-minute pop tune, a non-musical theatrical event, or a complete symphony.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
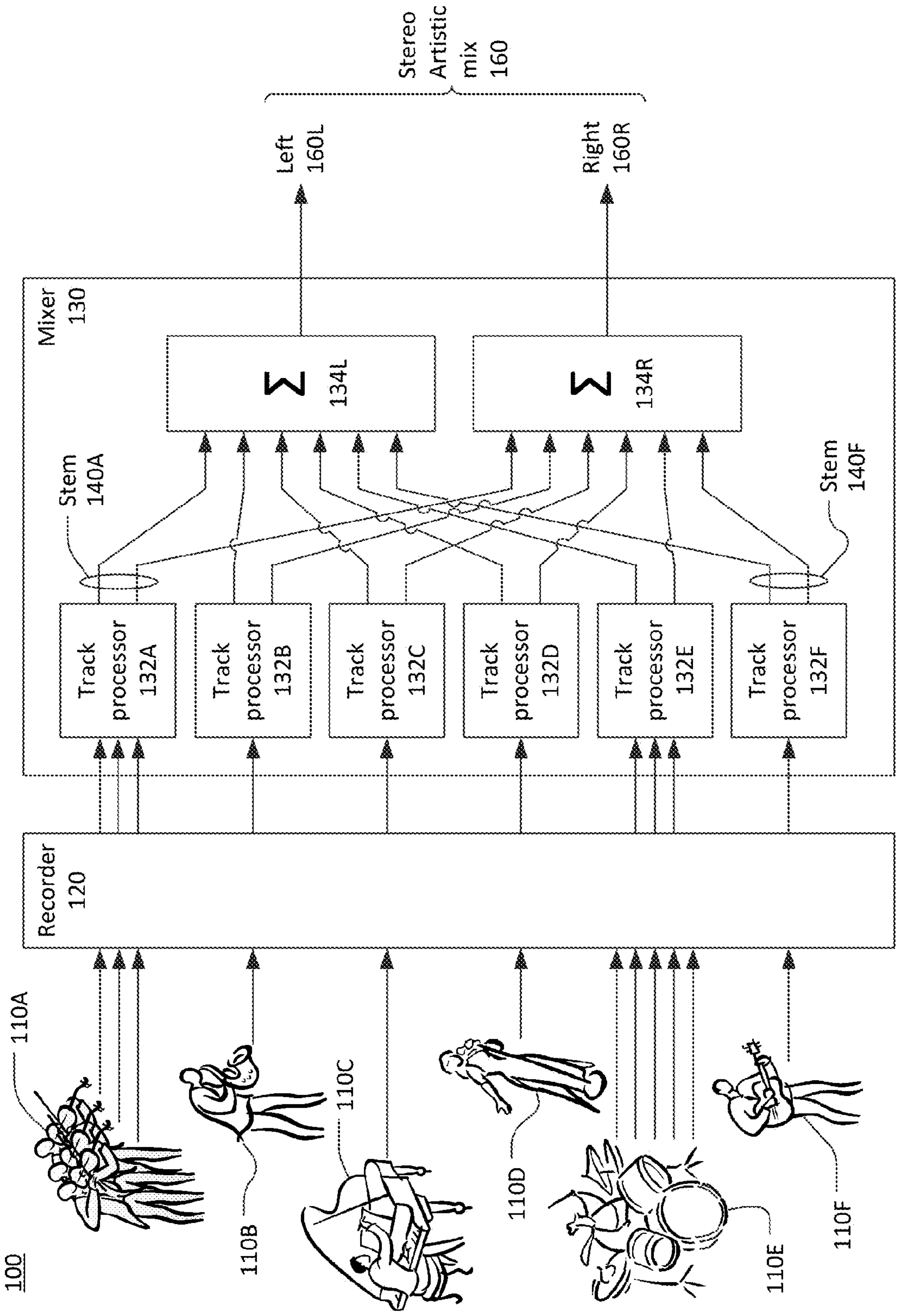
FIG. 1 PRIOR ART
FIG. 1 is a block diagram of a conventional system for creating an artistic mix.

Referring now to FIG. 1, a system 100 for producing an artistic mix may include a plurality of musicians and musical instruments 110A-110F, a recorder 120, and a mixer 130. Sounds produced by the musicians and instruments 110A-110F may be converted into electrical signals by transducers such as microphones, magnetic pickups, and piezoelectric pickups. Some instruments, such as electronic keyboards, may produce electrical signals directly without an intervening transducer. In this context, the term "electrical signal" includes both analog signals and digital data.

These electrical signals may be recorded by the recorder 120 as a plurality of tracks. Each track may record the sound produced by a single musician or instrument, or the sound produced by a plurality of instruments. In some cases, such as a drummer playing a set of drums, the sound produced by a single musician may be captured by a plurality of transducers. Electrical signals from the plurality of transducers may be recorded as a corresponding plurality of tracks or may be combined into a reduced number of tracks prior to recording. The various tracks to be combined into an artistic mix need not be recorded at the same time or even in the same location.

Once all of the tracks to be mixed have been recorded, the tracks may be combined into an artistic mix using the mixer 130. Functional elements of the mixer 130 may include track processors 132A-132F and adders 134L and 134R. Historically, track processors and adders were implemented by analog circuits operating on analog audio signals. Currently, track processors and adders are typically implemented using one or more digital processors such as digital signal processors. When two or more processors are present, the functional partitioning of the mixer 130 shown in FIG. 1 need not coincide with a physical partitioning of the mixer 130 between multiple processors. Multiple functional elements may be implemented within the same processor, and any functional element may be partitioned between two or more processors.

Each track processor 132A-132F may process one or more recorded tracks. The processes performed by each track processor may include some or all of summing or mixing multiple tracks; level modification by amplification or attenuation; spectrum modification such as low pass filtering, high pass filtering, or graphic equalization; dynamic range modification such as limiting or compression; time-domain modification such as phase shifting or delay; noise, hum, and feedback suppression; reverberation; and other processes. Specialized processes such as de-essing and chorusing may be performed on vocal tracks. Some processes, such as level modification, may be performed on individual tracks before they are mixed or added, and other processes may be performed after multiple tracks are mixed. The output of each track processor 132A-132F may be a respective stem 140A-140F, of which only stems 140A and 140F are identified in FIG. 1.

In the example of FIG. 1, each stem 140A-140F may include a left component and a right component. A right adder 134R may sum the right components of the stems 140A-140F to provide a right channel 160R of the stereo artistic mix 160. Similarly, a left adder 134L may sum the left components of the stems 140A-140F to provide a left channel 160L of the stereo artistic mix 160. Although not shown in FIG. 1, additional processing, such as limiting or dynamic range compression, may be performed on the signals output from the left and right adders 134L and 134R.

Each stem 140A-140F may include sounds produced by a particular instrument or group of instruments and musicians. The instrument or group of instruments and musicians included in a stem will be referred to herein as the "voice" of the stem. Voices may be named to reflect the musicians or instruments that contributed the tracks that were processed to generate the stem. For example, in FIG. 1, the output of track processor 132A may be a "strings" stem, the output of track processor 132D may be a "vocal" stem, and the output of track processor 132E may be a "drums" stem. Stems need not be limited to a single type of instrument, and a single type of instrument may result in more than one stem. For example, the strings 110A, the saxophone 110B, the piano 110C, and the guitar 110F may be recorded as separate tracks but may be combined into a single "instrumental" stem. For further example, for drum-intensive music such as heavy metal, the sounds produced by the drummer 110E may be incorporated into several stems such as a "kick drum" stem, a "snare and cymbals" stem, and an "other drums" stem. These stems may have substantially different frequency spectrums and may be processed differently during mixing.

The stems 140A-140F generated during the creation of the stereo artistic mix 160 may be stored. Additionally, metadata identifying the voice, instrument or musician in the stem may be associated with each stem audio object. Associated metadata may be attached to each stem audio object or may be stored separately. Other metadata, such as the title of the song, the name of the group or musician, the genre of the song, the recording and/or mixing date, and other information may be attached to some or all of the stem audio objects or stored as a separate data object.

Figure 2A:
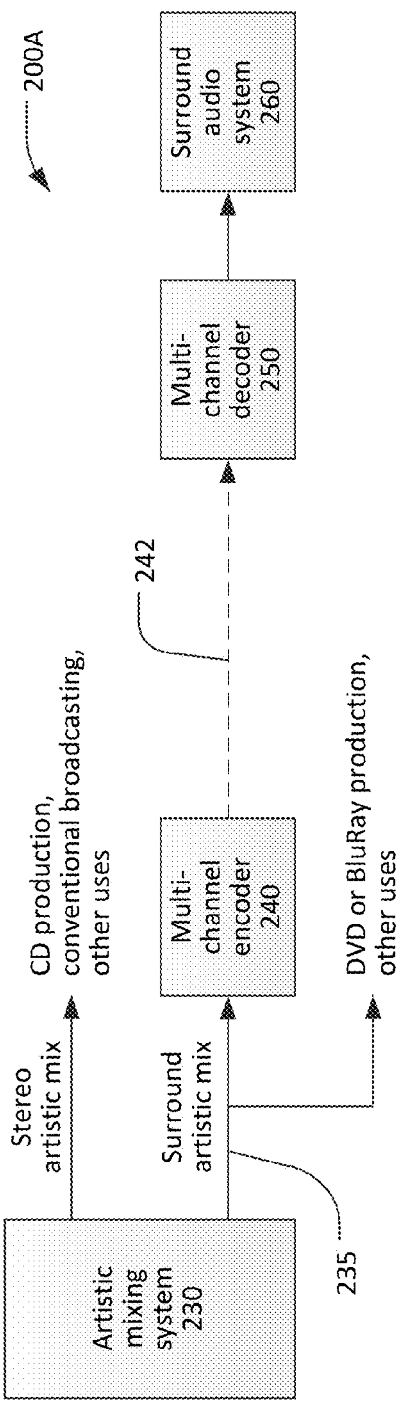
FIG. 2A PRIOR ART
FIG. 2A is a block diagram of a system for distributing a surround mix.

FIG. 2A is a block diagram of a conventional system 200A for distributing a surround audio mix. An artistic mixing system 230, which may be, for example, a digital audio workstation, may be used to create both a stereo artistic mix and a surround artistic mix 235. The stereo artistic mix may be used for production of compact discs, for conventional stereo radio broadcasting, and for other uses. The surround artistic mix 235 may be used for BluRay production (e.g. a BluRay HDTV concert recording) and other uses. The surround artistic mix 235 may also be encoded by a multichannel encoder 240 and distributed, for example via the Internet or other network.

The multichannel encoder 240 may encode the surround artistic mix 235 in accordance with the MPEG-2 (Motion Picture Experts Group) standard, which allows encoding audio mixes with up to six channels for 5.1 surround audio systems. The multichannel encoder 240 may encode the surround artistic mix 235 in accordance with the Free Lossless Audio Coder (FLAC) standard, which allows encoding audio mixes with up to eight channels. The multichannel encoder 240 may encode the surround artistic mix 235 in accordance with the Advanced Audio Coding (AAC) enhancement to the MPEG-2 and MPEG-4 standards. AAC allows encoding audio mixes with up to 48 channels. The multichannel encoder 240 may encode the surround artistic mix 235 in accordance with some other standard.

The encoded audio produced by the multichannel encoder 240 may be transmitted over a distribution channel 242 to a compatible multichannel decoder 250. The distribution channel 242 may be a wireless broadcast, a network such as the Internet or a cable TV network, or some other distribution channel. The multichannel decoder 250 may recreate or nearly recreate the channels of the surround artistic mix 235 for presentation to listeners by a surround audio system 260.

Figure 2B:
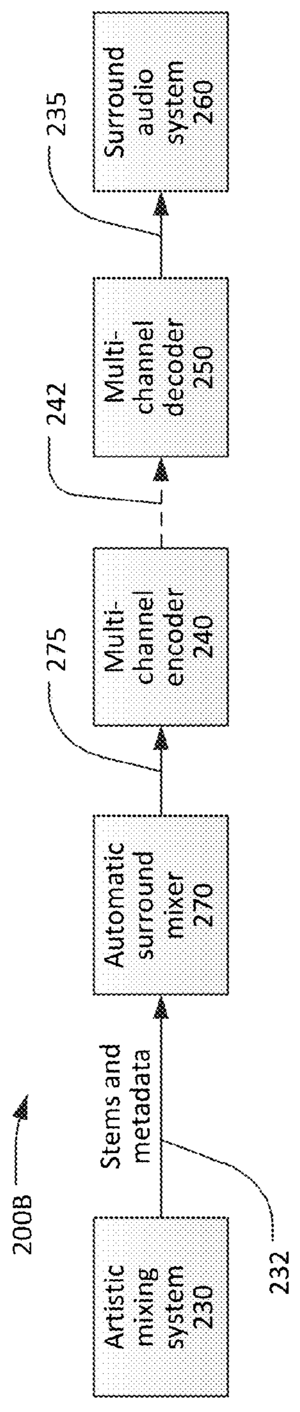
FIG. 2B is a block diagram of another system for distributing a surround mix.

As previously described, every stereo artistic mix does not necessarily have an associated surround artistic mix. FIG. 2B is a block diagram of another system 200B for distributing a surround audio mix in situations where a surround artistic mix of an audio program does not exist. In the system 200B, a surround mix may be synthesized from stems and metadata 232 developed during creation of a stereo artistic mix. Stems and metadata 232 from the artistic mixing system 230 may be input to an automatic surround mixer 270 that produces a surround mix 275. The term "automatic" generally means without operator participation. Once an operator has initiated the operation of the automatic surround mixer 270, the surround mix 275 may be produced without further operator participation.

The surround mix 275 may be encoded by the multichannel encoder 240 and transmitted over a distribution channel 242 to a compatible multichannel decoder 250. The multichannel decoder 250 may recreate or nearly recreate the channels of the surround mix 275 for presentation to listeners by a surround audio system 260. In the system 200B, a single surround mix produced by the automatic surround mixer 270 is distributed to all listeners.

Figure 2C:
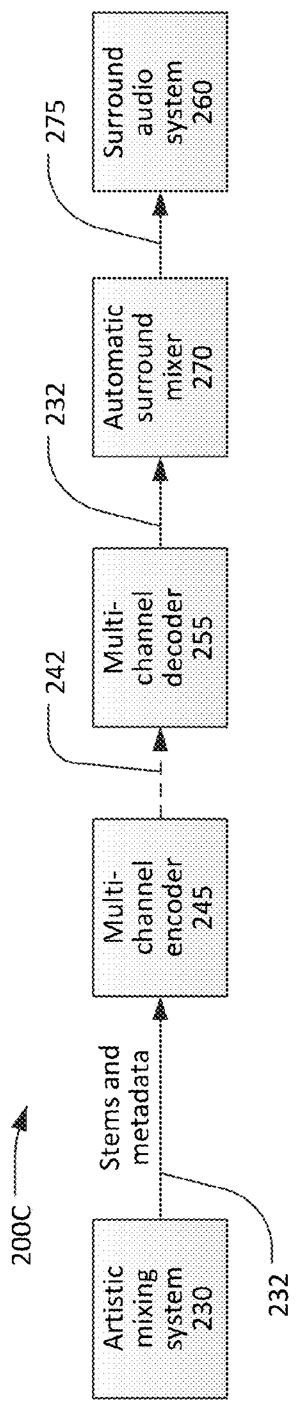
FIG. 2C is a block diagram of another system for distributing a surround mix.

FIG. 2C is a block diagram of another system 200C for distributing a surround audio mix. In the system 200C, each listener may tailor a customized surround mix suited for their personal preferences and audio system. Stems and metadata 232 from the artistic mixing system 230 may be input to a multichannel encoder 245 which is like the multichannel encoder 240 but capable of encoding stems rather than (or in addition to) channels.

The encoded stems may then be transmitted via a distribution channel 242 to a compatible multichannel decoder 255. The multichannel decoder 255 may recreate or nearly recreate the stems and metadata 232. The automatic surround mixer 270 may produce a surround mix 275 based on the recreated stems and metadata. The surround mix 275 may be tailored to the listener's preferences and/or the peculiarities of the listener's surround audio system 260.

Figure 3:
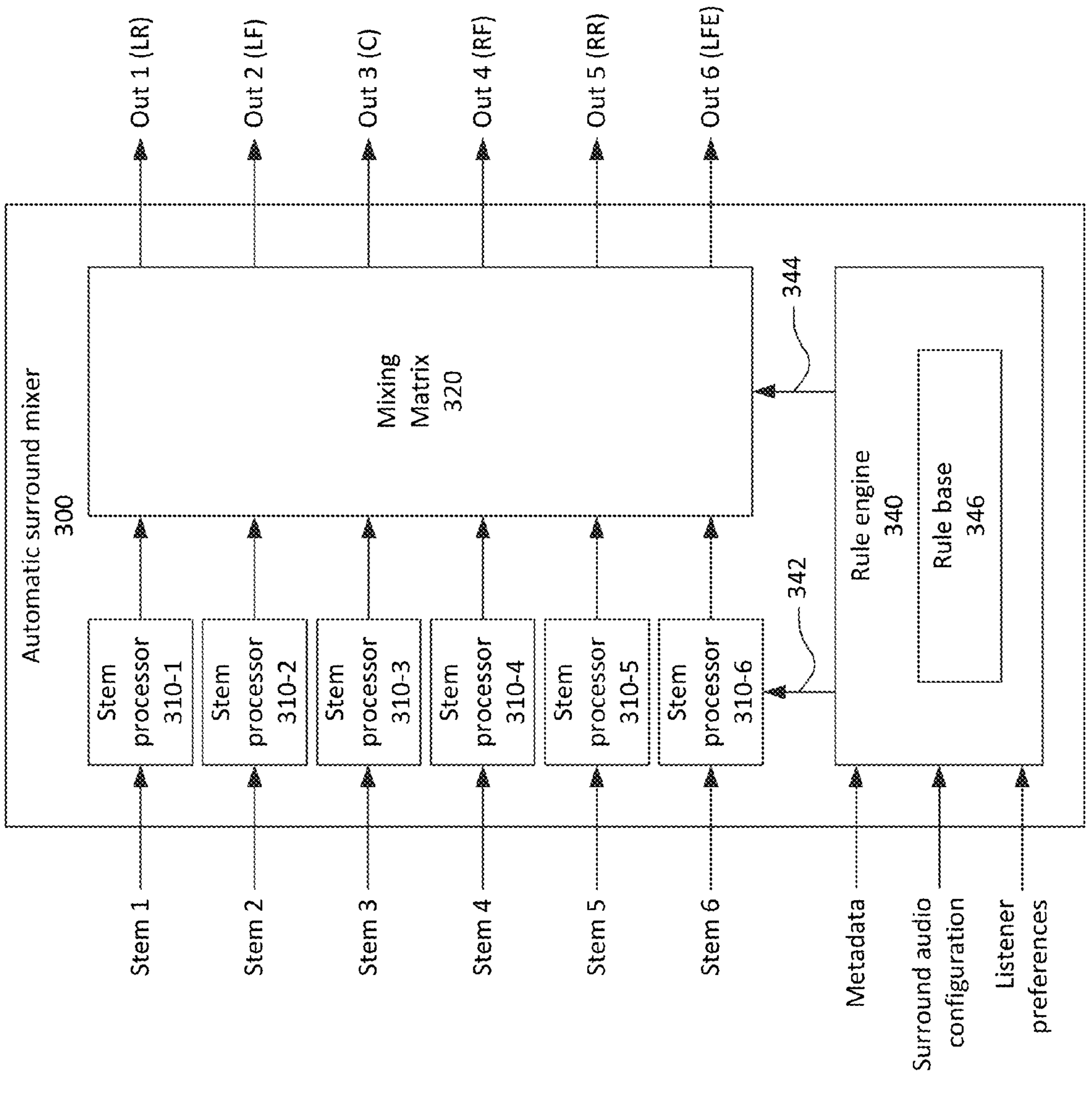
FIG. 3 is a functional block diagram of an automatic mixer.

Referring now to FIG. 3, an automatic surround mixer 300, such as the automatic surround mixer 270 of FIG. 2B and FIG. 2C, may produce a multichannel surround mix from stems created as part of the process of creating a stereo artistic mix. The automatic surround mixer 300 may produce a multichannel surround mix without requiring the participation of a recording engineer or the artist. In this example, the automatic surround mixer 300 accepts 6 stems, identified as Stem 1 through Stem 6. An automatic mixer may accept more or fewer than six stems. Each stem may be monaural or stereo having left and right components. In this example, the automatic surround mixer 300 outputs six channels, identified as Out 1 through Out 6. Out 1 through Out 6 may correspond to left rear, left front, center, right front, right rear, and low frequency effects channels appropriate for a 5.1 surround audio system. An automatic surround mixer may output eight channels for a 7.1 surround audio system or some other number of channels.

The automatic surround mixer 300 may include a respective stem processor 310-1 to 310-6 for each input stem, a mixing matrix 320 that combines the processed stems in various proportions to provide the output channels, and a rule engine 340 to determine how the stems should be processed and mixed.

Each stem processor 310-1 to 310-6 may be capable of performing processes such as level modification by amplification or attenuation; spectrum modification by low pass filtering, high pass filtering, and/or graphic equalization; dynamic range modification by limiting, compression or decompression; noise, hum, and feedback suppression; reverberation; and other processes. One or more of the stem processors 310-1 to 310-6 may be capable of performing specialized processes such as de-essing and chorusing on vocal tracks. One or more of the stem processors 310-1 to 310-6 may provide multiple outputs subject to different processes. For example, one or more of the stems processors 310-1 to 310-6 may provide a low frequency portion of the respective stem for incorporation into the LFE channel and higher frequency portions of the respective stem for incorporation into one or more of the other output channels.

Each stem input to the automatic surround mixer 300 may have been subject to some or all of these processes as part of creating a stereo artistic mix. Thus, to preserve the general sound and feel of the stereo artistic mix, minimal processing may be performed by the stem processor 310-1 to 310-6. For example, the only processing performed by the stem processors may be adding reverberation to some or all of the stems and low-pass filtering to provide the LFE channel.

Each of the stem processors 310-1 to 310-6 may process the respective stem in accordance with effects parameters 342 provided by the rule engine 340. The effects parameters 342 may include, for example, data specifying an amount of attenuation or gain, a knee frequency and a slope of any filtering to be applied, equalization coefficients, compression or decompression coefficients, a delay and a relative amplitude of reverberation, and other parameters defining processes to be applied to each stem.

The mixing matrix 320 may combine the outputs from the stem processors 310-1 to 310-6 to provide the output channels in accordance with mixing parameters 344 provided by the rule engine. For example, the mixing matrix 320 may generate each output channel in accordance with the formula:

$$C_j(t) = \sum_{i=1}^{n} a_{i,j} S_i(t - d_{i,j}) \quad (1)$$

where $C_j(t)$=output channel j at time t;

$S_i$=the output of stem processor i at time t;

$a_{i,j}$=an amplitude coefficient;

$d_{i,j}$=a time delay; and n=the number of stems used in the mix.

The amplitude coefficients $a_{i,j}$ and the time delays $d_{i,j}$ may be included in the mixing parameters 344.

The rule engine 340 may determine the effects parameters 342 and the mixing parameters 344 based, at least in part, on metadata associated with the input stems. Metadata may be generated during the creation of a stereo artistic mix and may be attached to each stem object and/or included in a separate data object. The metadata may include, for example, the voice or type of instrument contained in each stem, the genre or other qualitative description of the program, data indicating the processing done on each stem during creation of the stereo artistic mix, and other information. The metadata may also include descriptive material, such as the program title or artist, of interest to the listener but not used during creation of a surround mix.

When appropriate metadata cannot be provided with the stems, metadata including the voice of each stem and the genre of the song may be developed through analysis of the content of each stem. For example, the spectral content of each stem may be analyzed to estimate what voice is contained in the stem and the rhythmic content of the stems, in combination with the voices present in the stems, may allow estimation of the genre of the song.

The automatic surround mixer 300 may be incorporated into a listener's surround audio system. In this case, the rule engine 340 may have access to configuration data indicating the surround audio system configuration (5.0, 5.1, 7.1, etc.) to be used to present the surround mix. When the automatic surround mixer 300 is not incorporated into a surround audio system, the rule engine 340 may receive information indicating the surround audio system configuration, for example, as manual inputs by the listener. Information indicating the surround audio system configuration may be obtained automatically from the audio system, for example by communications via an HDMI (high definition media interconnect) connection.

The rule engine 340 may determine the effects parameters 342 and the mixing parameters 344 using a set of rules stored in a rule base. In this patent, the term "rules" encompasses logical statements, tabulated data, and other information used to generate effects parameters 342 and mixing parameters 344. Rules may be empirically developed, which is to say the rules may be based on the collected experience of one or more sound engineers who have created one or more artistic surround mixes. Rules may be developed by collecting and averaging mixing parameters and effects parameters for a plurality of artistic surround mixes. The rule base 346 may include different rules for different music genres and different rules for different surround audio system configurations.

In general, each rule may include a condition and an action that is executed if the condition is satisfied. The rule engine may evaluate the available data (i.e. metadata and speaker configuration data) and determine what rule conditions are satisfied. The rule engine 340 may then determine what actions are indicated by the satisfied rules, resolve any conflicts between the actions, and cause the indicated actions to occur (i.e. set the effects parameters 342 and the mixing parameters 344).

Rules stored in the rule base 346 may be in declarative form. For example, the rules stored in the rule base 346 may include "lead vocal goes to the center channel". This rule, as stated, would apply to all music genres and all surround audio system configurations. The condition in the rule is inherent—the rule only applies if a lead vocal stem is present.

A more typical rule may have an expressed condition. For example, the rules stored in the rule base 346 may include "if the audio system has a sub-woofer, then low frequency components of drum, percussion, and bass stems go to the LFE channel, else low frequency components of drum, percussion, and bass stems are divided between the left front and right front channels". A rule's express condition may incorporate logical expressions ("and", "or", "not", etc.).

Figure 4:
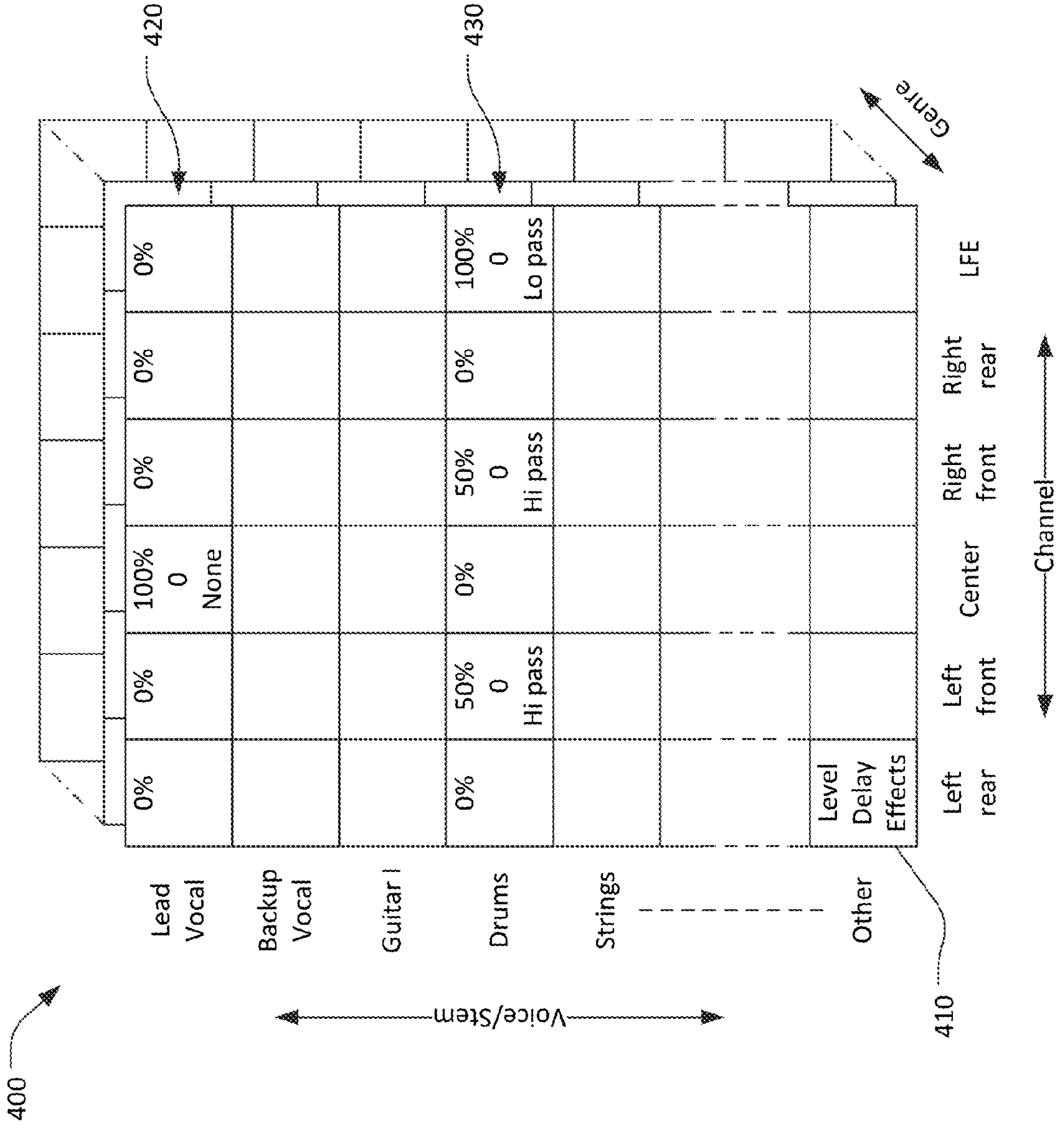
FIG. 4 is a graphical representation of a rule base.

A common form of rule may have a condition, such as "if the genre of the music is X and the voice is Y, then . . . ." Rules of this type and other types may be stored in the rule base 346 in tabular form. For example, as shown in FIG. 4, rules may be organized as a three-dimensional table 400 where the three coordinate axes represent stem voice, genre, and channel. Each entry 410 may include mixing parameters (level and delay coefficients) and effects parameters for a particular combination of stem voice and genre. The table 400 is specific to a 5.1 surround audio configuration. Different tables may be stored in the rule base for other surround audio configurations.

For example, row 420 of the table 400 implements the rule, "for a 5.1 surround audio system and this particular genre, the lead vocal goes to the center channel" with the assumption that no effects processing is performed on the lead vocal stem. For further example, the row 430 of the table 400, implements the rule, "for a 5.1 surround audio system and this particular genre, low frequency components of the drum stem go to the LFE channel and high frequency components of the drum stem are divided between the front left and front right channels".

Referring back to FIG. 3, when the rule base 346 includes rules in tabular form, the rule engine may use the metadata and surround audio configuration to retrieve effects parameters 342 and mixing parameters 344 from an appropriate table. The rule engine 340 may rely solely on tabular rules, or may have additional rules to handle situations not adequately addressed by tabulated rules. For example, a small number of successful rock bands used two drummers, and many recorded songs feature two lead vocalists. These situations could be addressed by additional table entries or by an additional rule such as, "if two stems have the same voice, weigh one to the left and the other to the right".

The rule engine 340 may also receive data indicating listener preferences. For example, the listener may be provided an option to elect a conventional mix and a nonconventional mix such as an a cappella (vocals only) mix or a "karaoke" mix (lead vocal suppressed). An election of a nonconventional mix may override some of the mixing parameters selected by the rule engine 340.

The functional elements of the automatic surround mixer 300 may be implemented by analog circuits, digital circuits, and/or one or more processors executing an automatic mixer software program. For example, the stem processors 310-1 to 310-6 and the mixing matrix 320 may be implemented using one or more digital processors such as digital signal processors. The rule engine 340 may be implemented using a general purpose processor. When two or more processors are present, the functional partitioning of the automatic surround mixer 300 shown in FIG. 3 need not coincide with a physical partitioning of the automatic surround mixer 300 between the multiple processors. Multiple functional elements may be implemented within the same processor, and any functional element may be partitioned between two or more processors.

Figure 5:
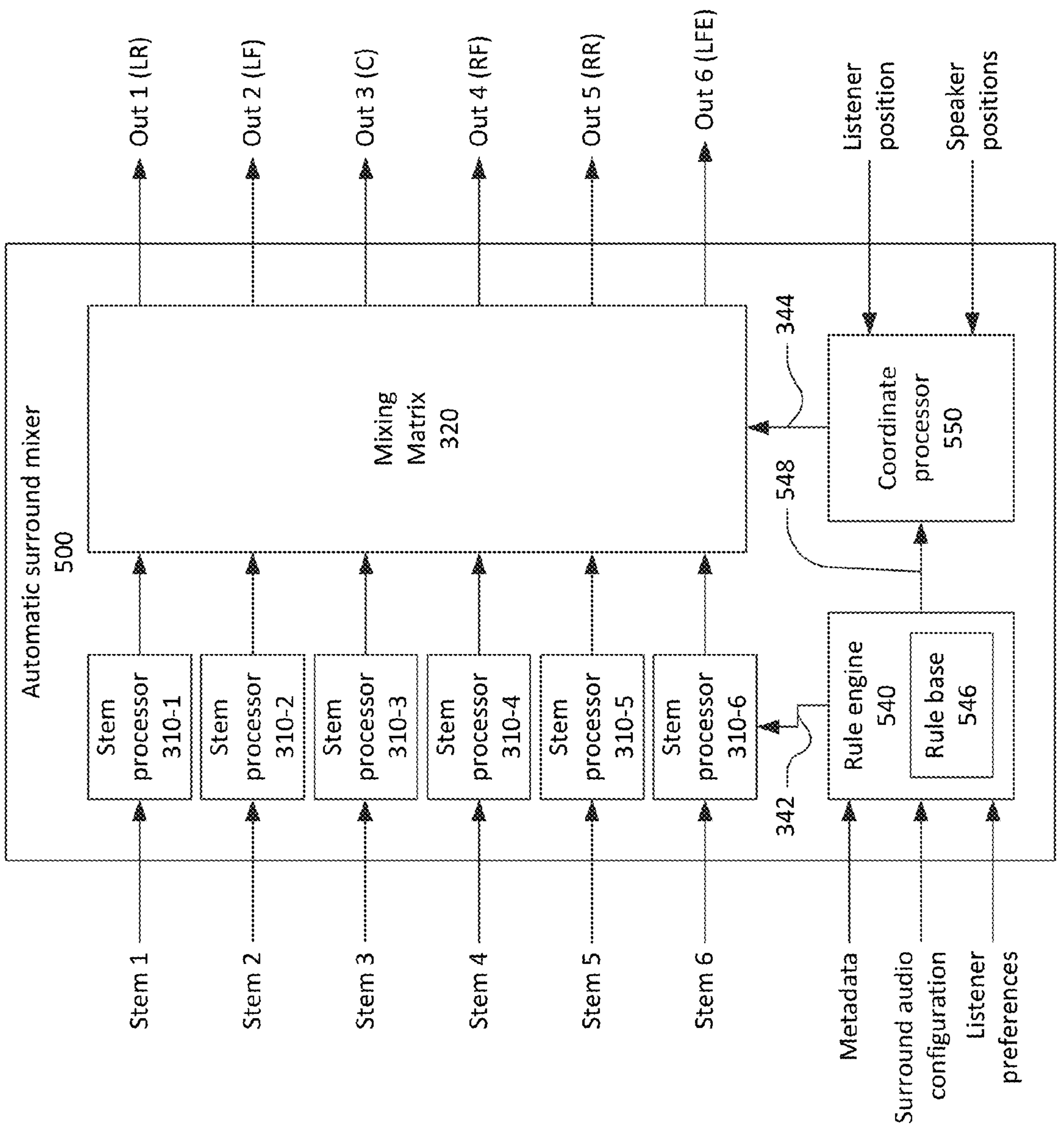
FIG. 5 is a functional block diagram of another automatic mixer.

Referring now to FIG. 5, an automatic surround mixer 500 may include stem processors 310-1 to 310-6 that process respective stems in accordance with effects parameters 342 as previously described. The automatic surround mixer 500 may include mixing matrix 320 to combine the outputs from stem processors 310-1 to 310-6 in accordance with mixing parameters 344 as previously described.

The automatic surround mixer 500 may also include a rule engine 540 and a rule base 546. The rule engine 540 may determine effects parameters 342 based on metadata and surround audio system configuration data as previously described.

The rule engine 540 may not directly determine the mixing parameters 344, but may rather determine relative voice position data 548 based on rules stored in the rule base 546. Each relative voice position may indicate a position on virtual stage of a hypothetical source of the respective stem. For example, the rule base 546 would not include the rule, "the lead vocal goes to the center channel", but may include the rule, "the lead vocalist is positioned at the center front of the stage". Similar rules may define the positions of other voices/musicians on the virtual stage for various genres.

Figure 6:
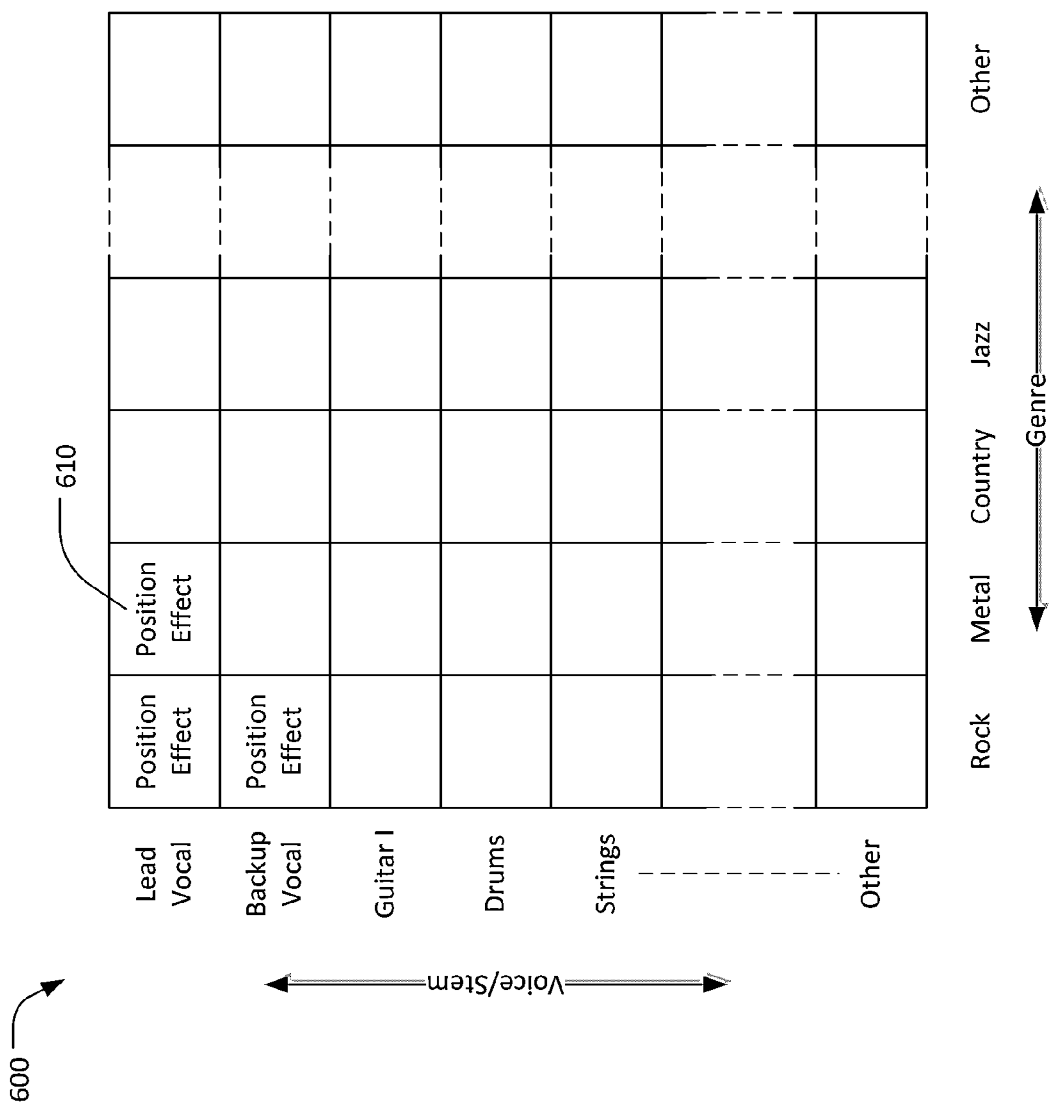
FIG. 6 is a graphical representation of another rule base.

A common form of rule may have a condition, such as "if the genre of the music is X and the voice is Y, then . . . ." Rules of this type may be stored in the rule base 546 in tabular form. For example, as shown in FIG. 6, rules may be organized as a two-dimensional table 600 where the coordinate axes represent stem voice and genre. Each entry 610 may include a position and effects parameters for a particular combination of stem voice and genre. The table 600 may not be specific to any particular surround audio configuration.

Figure 7:
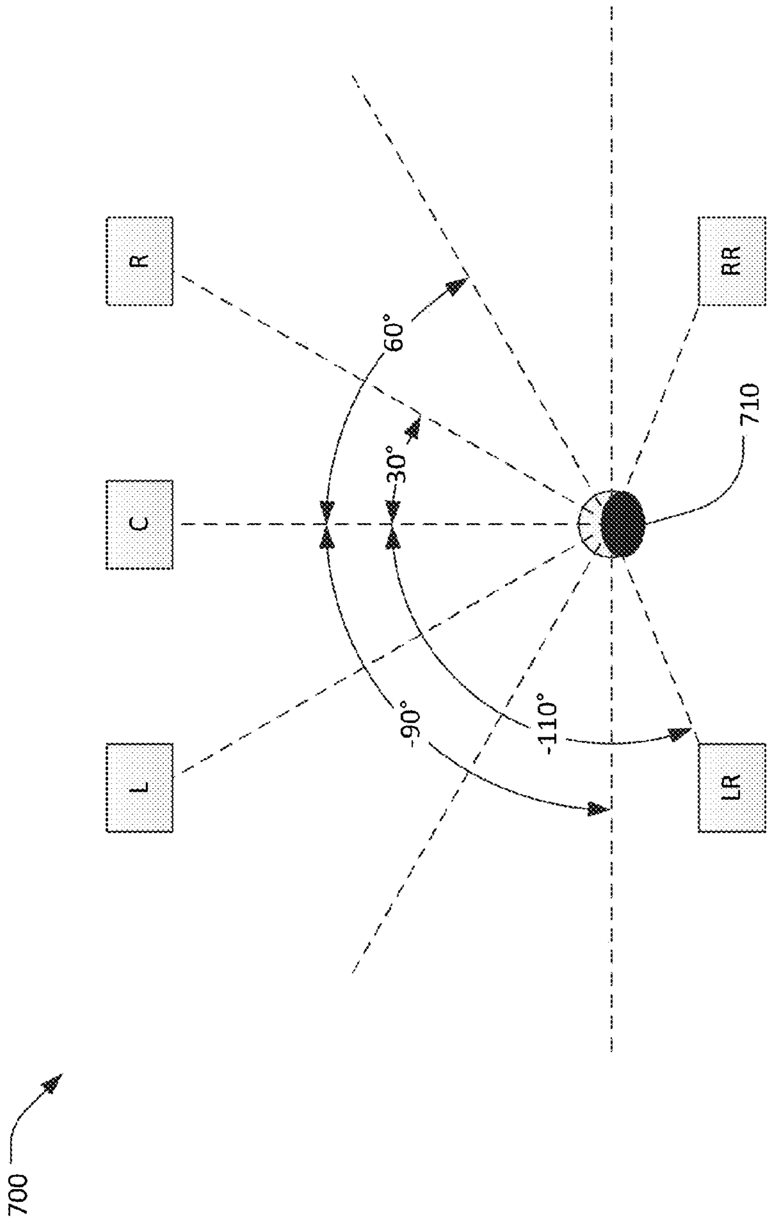
FIG. 7 is a graphical representation of a listening environment.

The rules described in the previous paragraphs are simple examples. A more complete, but still exemplary, set if rules will be explained with reference to FIG. 7. FIG. 7 shows an environment including a listener 710 and a set of speakers labeled C (center), L (left front), R (right front), LR (left rear), and RR (right rear). The center speaker C is located, by definition, at an angle of zero degrees with respect to the listener 710. The left and right front speakers L, R are located at angles of −30 degrees and +30 degrees, respectively. The left and right rear speakers LR, RR are located at angles of −110 and +110 degrees, respectively. A subwoofer or LFE speaker is not shown in FIG. 7. Listeners have little ability to detect the direction of very low frequency sounds. Thus the relative location of the LFE speaker is not important.

A set of rules for mixing stems may be expressed in terms of the apparent angle from the listener to the source of the stem. The following exemplary set of rules may provide a pleasant surround mix for songs of various genres. Rules are stated in italics.

Drums are at ±30° and a reverberated drum component is at ±110°. Drums are considered the "backbone" of most kinds of popular music. In a stereo mix, drums are usually placed equally between the left and right speakers. In a 5.1 surround presentation, an option exists to present the illusion of the drums being in a room that surrounds the listener. Thus the drum stem may be divided between the front leaf and right channels and the drum stem may be reverberated and attenuated and sent to the left and right rear speakers)(±110°) to give the listener the impression that the drums are "in front" of them and that the reflections of a "Virtual Room" are behind them.

Bass are placed @ 0° −3 db with a +1.5 db contribution to L/R. Bass guitar, like drums is usually at the "phantom center" (divided equally between the left and right channels) in a stereo mix. In a 5.1 mix, a Bass stem may be spread across the left, right and center speakers in the following manner. The bass stem will be placed in the center channel, lowered in level by −3 db, and then added equally to the front left and right speakers at −1.5 db.

Rhythm Guitars are placed @ −60°. Inspection of FIG. 7 shows that there is not a speaker at −60°. The rhythm guitar stem may be divided between the left front speaker L and the left rear speaker LR to simulate a phantom source at −60°.

Keyboards are placed @ +60°. The keyboards stem may be divided between the right front speaker L and the right rear speaker LR to simulate a phantom source at −60°.

Background Vocals are placed @ ±90°. The background vocals stem may be divided between the left and right front speakers L, R and the left and right rear speakers LR, RR to simulate a phantom sources at ±90°.

Percussion is placed @ ±110°. The percussion stem may be divided between the left and right rear speakers LR, RR.

Lead Vocals are placed @ 0°−3 db with a +1.5 db contribution to L/R. Lead vocals are usually presented in the "Phantom Center" of a typical stereo mix. Spreading the lead vocal over the center, left, and right channels preserves the apparent location of the lead vocalist but adds fullness and complexity to the presentation.

Referring back to FIG. 5, when the rule base 546 includes rules in tabular form, the rule engine 540 may use the metadata and surround audio configuration to retrieve effects parameters 342 and voice position data 548 from an appropriate table. The rule engine 540 may rely totally on tabular rules, or may have additional rules to handle situations not adequately addressed by tabulated rules as previously described.

The rule engine 540 may also receive data indicating listener preferences. For example, the listener may be provided an option to elect a conventional mix and a nonconventional mix such as an a cappella (vocals only) mix or a karaoke mix (lead vocal or lead and background vocals suppressed). The listener may have an option to select an "educational" mix where each stem is sent to a single speaker channel to allow the listener to focus on a particular instrument. An election of a nonconventional mix may override some of the mixing parameters selected by the rule engine 540.

The rule engine 540 may supply the voice position data 548 to a coordinate processor 550. The coordinate processor 550 may receive a listener election of a virtual listener position with respect to the virtual stage on which the voices are positioned. The listener election may be made, for example, by prompting the listener to choose one of two or more predetermined alternative positions. Possible choices for virtual listener position may include "in the band" (e.g. in the center of the virtual stage surrounded by the voices), "front row center", and/or "middle of the audience". The coordinate processor 550 may then generate mixing parameters 344 that cause the mixing matrix 320 to combine the processed stems into channels that provide the desired listener experience.

The coordinate processor 550 may also receive data indicating the relative position of the speakers in the surround audio system. This data may be used by the coordinate processor 550 to refine the mixing parameters to compensate, to at least some extent, for deviations in the speaker arrangement relative to the nominal speaker arrangement (such as the speaker arrangement shown in FIG. 7). For example, the coordinate processor may compensate, to some extent, for asymmetries in the speaker locations, such as the left and right front speakers not being in symmetrical positions with respect to the center speaker.

The functional elements of the automatic surround mixer 500 may be implemented by analog circuits, digital circuits, and/or one or more processors executing an automatic mixer software program. For example, the stem processors 310-1 to 310-6 and the mixing matrix 320 may be implemented using one or more digital processors such as digital signal processors. The rule engine 540 and the coordinate processor 550 may be implemented using one or more general purpose processors. When two or more processors are present, the functional partitioning of the automatic surround mixer 500 shown in FIG. 5 may not coincide with a physical partitioning of the automatic surround mixer 500 between the multiple processors. Multiple functional elements may be implemented within the same processor, and any functional element may be partitioned between two or more processors.

Description of Processes.

Figure 8:
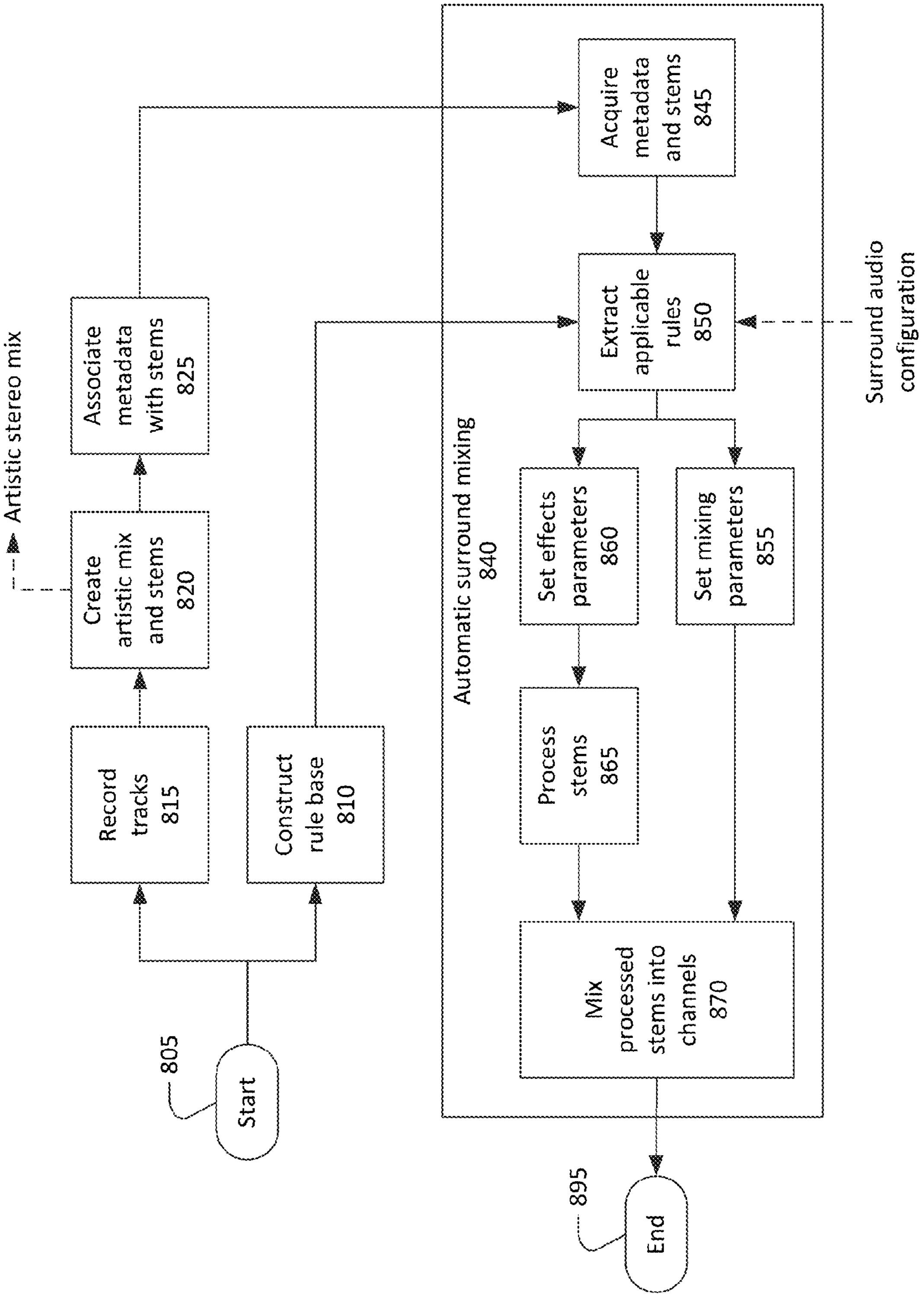
FIG. 8 is a flow chart of a process for automatically creating a surround mix.

Referring now to FIG. 8, a process 800 for providing a surround mix of a song may start at 805 and end at 895. The process 800 is based on the assumption that a stereo artistic mix is first created for the song and that a multichannel surround mix is subsequently generated automatically from stems stored during the creation of the stereo artistic mix.

At 810, a rule base such as the rule bases 346 and 546 may be developed. The rule base may contain rules for combining stems into a surround mix. These rules may be developed by analysis of historical artistic surround mixes, by accumulating the consensus opinions and practices of recording engineers with experience creating artistic surround mixes, or in some other manner. The rule base may contain different rules for different music genres and different rules for different surround audio configuration. Rules in the rule base may be expressed in tabular form. The rule base is not necessarily permanent and may be expanded over time, for example to incorporate new mixing techniques and new music genres.

The initial rule base may be prepared before, during, or after, a first song is recorded and a first artistic stereo mix is created. An initial rule base must be developed before a surround mix can be automatically generated. The rule base constructed at 810 may be conveyed to one or more automatic mixing systems. For example, the rule base may be incorporated into the hardware of each automatic surround mixing system or may be transmitted to each automatic surround mixing system over a network.

Tracks for the song may be recorded at 815. An artistic stereo mix may be created at 820 by processing and combining the tracks from 815 using known techniques. The artistic stereo mix may be used for conventional purposes such as recording CDs and radio broadcasting. During the creation of the artistic stereo mix at 820, two or more stems may be generated. Each stem may be generated by processing one or more tracks. Each stem may be a component or sub-mix of the stereo artistic mix. A stereo artistic mix may typically be composed of four to eight stems. As few as two stems and more than eight stems may be used for some mixes. Each stem may include a single channel or a left channel and a right channel.

At 825, metadata may be associated with the stems created at 820. The metadata may be generated during the creation of a stereo artistic mix at 820 and may be attached to each stem object and/or stored as a separate data object. The metadata may include, for example, the voice (i.e. type of instrument) of each stem, the genre or other qualitative description of the song, data indicating the processing done on each stem during creation of the stereo artistic mix, and other information. The metadata may also include descriptive material, such as the song title or artist name, of interest to the listener but not used during creation of a surround mix.

When appropriate metadata is unavailable from 820, metadata including the voice of each stem and the genre of the song may be extracted from the content of each stem at 825. For example, the spectral content of each stem may be analyzed to estimate what voice is contained in the stem and the rhythmic content of the stems, in combination with the voices present in the stems, may allow estimation of the genre of the song.

At 845, the stems and metadata from 825 may be acquired by an automatic surround mixing process 840. The automatic surrounding mixing process 840 may occur at the same location and may use the same system as the stereo mixing at 820. In this case, at 845 the automatic mixing process may simply retrieve the metadata and stems from memory. The automatic surrounding mixing process 840 may occur at one or more locations remote from the stereo mixing. In this case, at 845, the automatic surround mixing process 840 may receive the stems and associated metadata via a distribution channel (not shown). The distribution channel may a wireless broadcast, a network such as the Internet or a cable TV network, or some other distribution channel.

At 850, the metadata associated with the stems and the surround audio configuration data may be used to extract applicable rules from the rule base. The automatic surround mixing process 840 may also use data indicating a target surround audio configuration (e.g. 5.0, 5.1, 7.1) to select rules. In general, each rule may define an express or inherent condition and one or more actions that are executed if the condition is satisfied. Rules may be expressed as logical statements. Some or all rules may be expressed in tabular form. Extracting applicable rules at 850 may include selecting only rules having conditions that are satisfied by the metadata and surround audio configuration data. The actions defined in each rule may include, for example, setting mixing parameters, effects parameters, and/or a relative position for a particular stem.

At 855 and 860, the extracted rules may be used to set mixing parameters and effects parameters, respectively. The action at 855 and 860 may be performed in any order or in parallel.

At 865, the stems may be processed into channels for the surround audio system. Processing the stems into channels may include perform processes on some or all of the stems in accordance with effects parameters set at 870. Processes that may be performed include level modification by amplification or attenuation; spectrum modification by low pass filtering, high pass filtering, and/or graphic equalization; dynamic range modification by limiting, compression or decompression; noise, hum, and feedback suppression; reverberation; and other processes. Additionally, specialized processes such as de-essing and chorusing may be performed on vocal stems. One or more of the stem may be divided into multiple components subject to different processes for inclusion in multiple channels. For example, one or more of the stems may be processed to provide a low frequency portion for incorporation into the LFE channel and a higher frequency portion for incorporation into one or more of the other output channels.

At 870, the processed stems from 865 may be mixed into channels. The channels may be input to the surround audio system. Optionally, the channels may also be recorded for future playback. The process 800 may end at 895 after the conclusion of the song.

Figure 9:
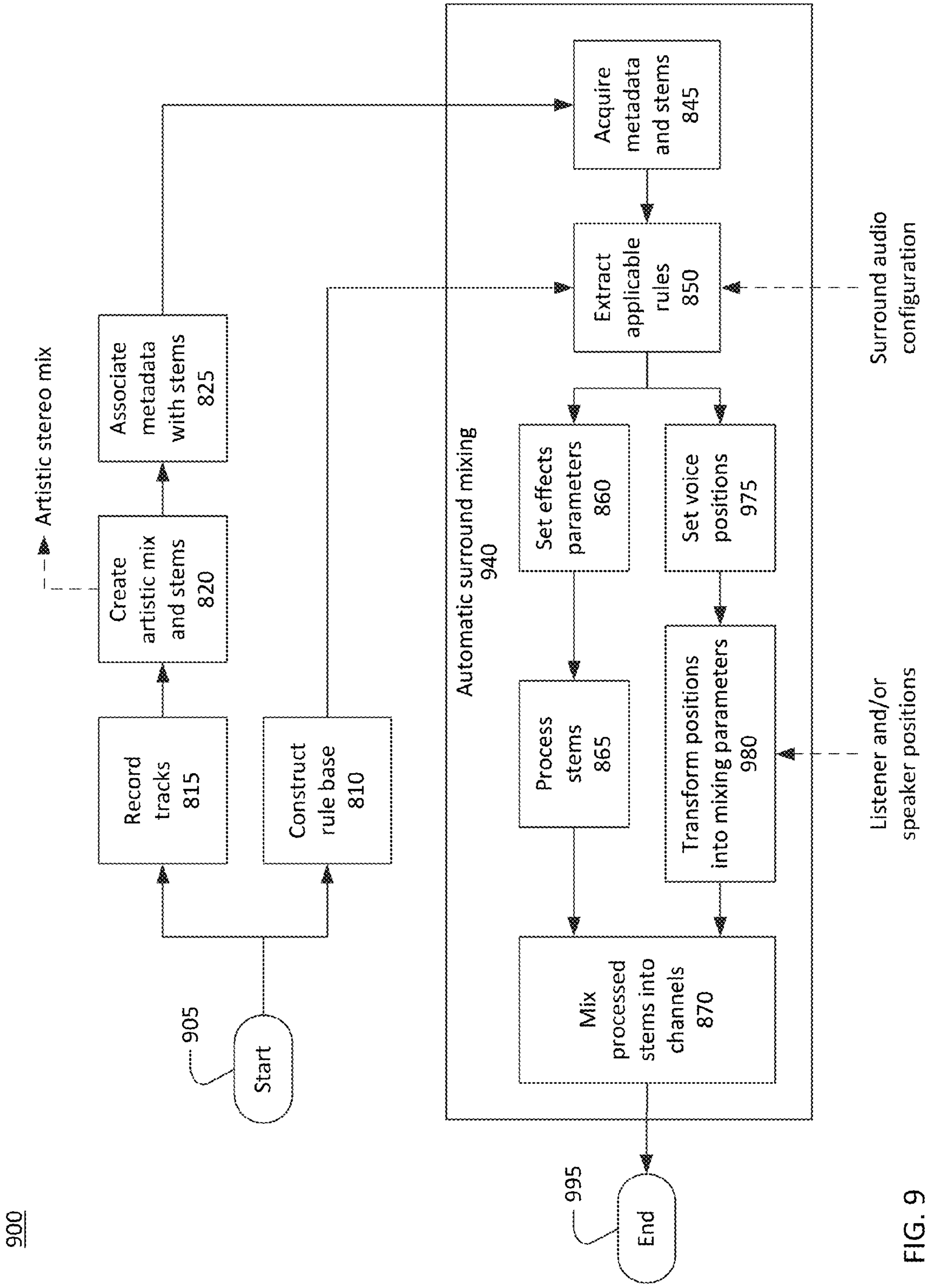
FIG. 9 is a flow chart of another process for automatically creating a surround mix.

Referring now to FIG. 9, another process 900 for providing a surround mix of a song may start at 905 and end at 995. The process 900 is similar to the process 700 except for the actions at 975 and 980. The descriptions of essentially duplicate elements will not be repeated, and any element not describes in conjunction with FIG. 9 has the same function as the corresponding element of FIG. 8.

At 975, rules extracted at 750 may be used to define a relative voice position for each stem. Each relative voice position may indicate a position on virtual stage of a hypothetical source of the respective stem. For example, a rule extracted at 750 may be, "the lead vocalist is positioned at the center front of the stage". Similar rules may define the positions of other voices/musicians on the virtual stage for various genres.

The automatic surround mixing process 940 may receive an operator's election of a virtual listener position with respect to the virtual stage on which the voices positions were defined at 975. The operator's election may be made, for example, by prompting the listener to choose one of two or more predetermined alternative positions. Example choices for virtual listener position include "in the band" (e.g. in the center of the virtual stage surrounded by the voices), "front row center", and/or "middle of the audience".

The automatic surround mixing process 940 may also receive data indicating the relative position of the speakers in the surround audio system. This data may be used to refine the mixing parameters to compensate, to at least some extent, for asymmetries in the speaker arrangement such as the center speaker not being centered between the left and right front speakers.

At 980, the voice positions defined at 975 may be transformed into mixing parameters in consideration of the elected virtual listener position and the speaker position data if available. The mixing parameters from 980 may be used at 770 to mix processed stems from 765 into channels that provide the desired listener experience.

Although not shown in FIG. 8 or FIG. 9, the automatic surround mixing process 840 or 940 may receive data indicating listener preferences. For example, the listener may be provided an option to elect a conventional mix and a nonconventional mix such as an a cappella (vocals only) mix or a "karaoke" mix (lead vocal suppressed). An election of a nonconventional mix may override some of the rules extracted at 850 or 950.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising:

an automatic mixer for creating a surround audio mix, comprising:

a rule engine to select a subset of a set of rules based, at least in part, on metadata indicating a respective voice of each of a plurality of stems and a genre associated with the plurality of stems; and a mixing matrix to mix the plurality of stems in accordance with mixing parameters determined from the selected subset of rules, the respective voice of each of the plurality of stems, and the genre associated with the plurality of stems to provide three or more output channels, wherein each of the three or more output channels is a weighted sum of the plurality of stems using weights included in the mixing parameters.

2. The system of claim 1, further comprising:

a multiple channel audio system including respective speakers to reproduce each of the output channels.

3. The system of claim 1, wherein each rule from the set of rules includes one or more conditions, and one or more actions to be taken if the conditions of the rule are satisfied.

4. The system of claim 3, wherein the rule engine is configured to select rules having conditions that are satisfied by the metadata.

5. The system of claim 3, wherein
the rule engine is configured to receive data indicating a surround audio system configuration, and
the rule engine is configured to select rules having conditions that are satisfied by the metadata and the surround audio system configuration.

6. The system of claim 3, wherein
the one or more actions included in each rule from the set of rules include setting one or more mixing parameters for the mixing matrix.

7. The system of claim 6 further comprising:
a stem processor to process at least one of the stems in accordance with the selected subset of rules.

8. The system of claim 7, wherein
the one or more actions included in each rule from the set of rules include setting one or more effects parameters for the stem processor.

9. The system of claim 8, wherein
the stem processor performs one or more of amplification, attenuation, low pass filtering, high pass filtering, graphic equalization, limiting, compression, phase shifting, noise, hum, and feedback suppression, reverberation, de-essing, and chorusing in accordance with the one or more effects parameters.

10. The system of claim 3, wherein
the actions included in the selected subset of rules collectively define respective voice positions on a virtual stage for respective voices of each of the plurality of stems.

11. The system of claim 10, further comprising:
a coordinate processor to transform the voice positions on the virtual stage into mixing parameters for the mixing matrix.

12. The system of claim 11, wherein
the coordinate processor is configured to receive data indicating a listener position with respect to the virtual stage, and
the coordinate processor is configured to transform the voice positions into the mixing parameters based, in part, on the listener position.

13. The system of claim 11, wherein
the coordinate processor is configured to receive data indicating relative speaker positions, and
the coordinate processor is configured to transform the voice positions into the mixing parameters based, in part, on the relative speaker positions.

14. A method for automatically creating a surround audio mix, comprising:
selecting a subset of a set of rules based, at least in part, on metadata indicating a respective voice of each of a plurality of stems and a genre associated with the plurality of stems; and
mixing the plurality of stems in accordance with mixing parameters determined from the selected subset of rules, the respective voice of each of the plurality of stems, and the genre associated with the plurality of stems to provide three or more output channels, wherein
mixing the plurality of stems to provide each of the three or more output channels comprises forming a respective weighted sum of the plurality of stems using weights included in the mixing parameters.

15. The method of claim 14, further comprising:
converting each of the output channels to audible sound using a multiple channel audio system including respective speakers for each of the output channels.

16. The method of claim 14, wherein
each rule from the set of rules includes one or more conditions, and
one or more actions to be taken if the conditions of the rule are satisfied.

17. The method of claim 16, wherein selecting a subset of the set of rules comprises:
selecting rules having conditions that are satisfied by the metadata.

18. The method of claim 16, further comprising:
receiving data indicating a surround audio system configuration, wherein
selecting a subset of the set of rules comprises selecting rules having conditions that are satisfied by the metadata and the surround audio system configuration.

19. The method of claim 16, wherein
the one or more actions included in each rule from the set of rules include setting one or more mixing parameters for the mixing matrix.

20. The method of claim 19 further comprising:
processing at least one of the stems in accordance with the selected subset of rules.

21. The method of claim 16, wherein
the one or more actions included in each rule from the set of rules include setting one or more effects parameters for processing at least one of the stems.

22. The method of claim 21, wherein processing at least one of the stems comprises:
one or more of amplifying, attenuating, low pass filtering, high pass filtering, graphic equalizing, limiting, compressing, phase shifting, suppressing noise, hum, and feedback, reverberating, de-essing, and chorusing in accordance with the one or more effects parameters.

23. The method of claim 16, wherein
the actions included in the selected subset of rules collectively define respective voice positions on a virtual stage for respective voices of each of the plurality of stems.

24. The method of claim 23, further comprising:
transforming the voice positions on the virtual stage into mixing parameters for the mixing matrix.

25. The method of claim 24, further comprising:
receiving data indicating a listener position with respect to the virtual stage, wherein
transforming the voice positions on the virtual stage into mixing parameters is based, in part, on the listener position.

26. The method of claim 24, further comprising:
receiving data indicating relative speaker positions, wherein
transforming the voice positions on the virtual stage into mixing parameters is based, in part, on the speaker positions.

* * * * *